(12) United States Patent
Hattori

(10) Patent No.: US 8,451,469 B2
(45) Date of Patent: May 28, 2013

(54) CONTROLLER FOR PRINTING DEVICE

(75) Inventor: Hiroshi Hattori, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 932 days.

(21) Appl. No.: 12/555,285

(22) Filed: Sep. 8, 2009

(65) Prior Publication Data

US 2010/0060916 A1 Mar. 11, 2010

(30) Foreign Application Priority Data

Sep. 9, 2008 (JP) ................................. 2008-230914

(51) Int. Cl.
*G06K 15/00* (2006.01)

(52) U.S. Cl.
USPC ......... 358/1.14; 358/1.9; 358/1.13; 358/1.15; 358/1.16; 358/1.18

(58) Field of Classification Search
None
See application file for complete search history.

(56) References Cited

U.S. PATENT DOCUMENTS

| | | | |
|---|---|---|---|
| 2003/0221053 A1* | 11/2003 | Lange et al. | 711/112 |
| 2004/0196474 A1* | 10/2004 | Ikegawa | 358/1.8 |
| 2004/0263905 A1* | 12/2004 | Okuyama | 358/1.16 |
| 2005/0024497 A1* | 2/2005 | Sakamoto et al. | 348/207.2 |
| 2005/0088682 A1 | 4/2005 | Miomo | |
| 2005/0200877 A1* | 9/2005 | Nitta | 358/1.13 |
| 2007/0201115 A1 | 8/2007 | Yoshida et al. | |

FOREIGN PATENT DOCUMENTS

| | | |
|---|---|---|
| JP | 2001-058431 | 3/2001 |
| JP | 2001-138584 | 5/2001 |
| JP | 2001-238022 | 8/2001 |
| JP | 2004-096688 | 3/2004 |
| JP | 2004096688 A * | 3/2004 |
| JP | 2005-125615 | 5/2005 |
| JP | 2007-267373 | 10/2007 |

OTHER PUBLICATIONS

Notification of Reasons for Rejection in connection with Japanese Application No. 2008-230914, mailed Apr. 13, 2010.

* cited by examiner

*Primary Examiner* — Miya J Cato
(74) *Attorney, Agent, or Firm* — Banner & Witcoff, Ltd.

(57) ABSTRACT

A controller for a printing device may include a data file selecting unit, an index printing data generating unit, and a providing unit. The data file selecting unit may sequentially select a data file. The index printing data generating unit may generate index printing data by sequentially storing a set of printing data in the memory, wherein the set of printing data defines an image described by the sequentially selected data file. The providing unit may provide the index printing data to a print performing unit. In a case where the index printing data generating unit cannot process a particular data file due to a shortage of remaining capacity in the memory when first index printing data is generated, the index printing data generating unit may postpone processing of the particular data file. The data file selecting unit may select the particular data file when second index printing data is generated.

10 Claims, 11 Drawing Sheets

CONTROLLER FOR PRINTING DEVICE

CROSS-REFERENCE TO RELATED APPLICATION

This application claims priority to Japanese Patent Application No. 2008-230914, filed on Sep. 9, 2008, the contents of which are hereby incorporated by reference into the present application.

BACKGROUND

1. Field

The present specification discloses a technology for generating index printing data.

2. Description of the Related Art

A printing device capable of index printing is known. This type of printing device generates printing data corresponding to each of a plurality of data files input into the printing device, generates index printing data including plural sets of printing data, and prints an image on one page of print medium in accordance with the index printing data. The printing device comprises a controller for generating the index printing data. The controller sequentially selects a data file from the plurality of data files in accordance with a predetermined order. The controller performs, using a memory, a process of sequentially generating a set of printing data from the selected data file, and sequentially stores the set of printing data in the memory. As a result, the controller generates the index printing data.

BRIEF SUMMARY OF THE INVENTION

There may be an occasion in which a memory capacity shortage occurs while the index printing data is being generated. If this shortage occurs, the controller cannot process a particular data file and generate a set of printing data corresponding to the particular data file. In the above printing device, when the controller cannot process the particular data file, the controller adopts a predetermined alternative set of printing data instead of the set of printing data corresponding to the particular data file, and stores the alternative set of printing data in the memory. As a result, generated index printing data does not include the set of printing data corresponding to the particular data file. Even if the printing device completes the printing operation in accordance with the generated index printing data, a user is not able to recognize the content of the particular data file.

An object of a technology disclosed herein is to increase a possibility that printing data corresponding to a data file can be printed by index printing, even if a controller cannot process the data file due to a memory capacity shortage.

The present specification discloses a controller for a printing device including a print performing unit. The controller may comprise a data file selecting unit, an index printing data generating unit, and a providing unit. The data file selecting unit may be configured to sequentially select a data file from a plurality of data files in accordance with a predetermined order. The index printing data generating unit may be configured to generate index printing data including plural sets of printing data corresponding to plural data files, by sequentially processing the sequentially selected data file using a memory, and by sequentially storing a set of printing data in the memory, wherein the set of printing data defines an image described by the sequentially selected data file. The providing unit may be configured to provide the index printing data to the print performing unit each time when the index printing data is generated. After the providing unit provides the index printing data to the print performing unit, the index printing data generating unit may become capable of generating subsequent index printing data by using an area in the memory which has been used for generating the index printing data. The unit of the index printing data is not limited. The index printing data may be generated in unit of page. Alternately, the index printing data may be generated in unit of band (smaller unit than the unit of page). In a case where the index printing data generating unit cannot process a particular data file due to a shortage of remaining capacity in the memory when first index printing data is generated, the index printing data generating unit may be configured to postpone processing of the particular data file. The data file selecting unit may be configured to select the particular data file when second index printing data is generated. The second index printing data may be generated after the first index printing data has been generated.

DETAILED DESCRIPTION OF THE PREFERRED EMBODIMENTS (First Embodiment)

Figure 1:
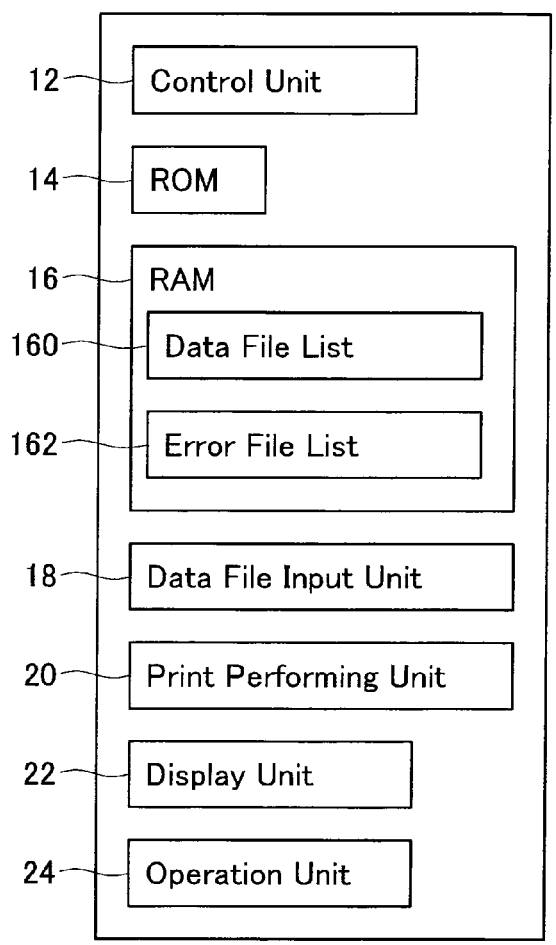
FIG. 1 illustrates a block diagram indicating a schematic structure of a printing device.

An embodiment will be explained by referring to drawings. As shown in FIG. 1, a printing device 10 is provided with a control unit 12, ROM 14, RAM 16, data file input unit 18, print performing unit 20, display unit 22 and operation unit 24.

The control unit 12 executes various processing operations in accordance with pre-installed computer programs and controls overall sequence of the printing device 10. The processes performed by the control unit 12 will be described in detail below. The ROM 14 stores the pre-installed computer programs. The data file input unit 18 inputs data files output by an external peripheral device. The data file input unit 18 may be a reader that reads data files stored in an external memory device such as a CD-ROM or a card type memory device. Alternatively, the data file input unit 18 may be connected to a network, and may be a receiver that receives data files transmitted from an external PC via the network.

Figure 2:
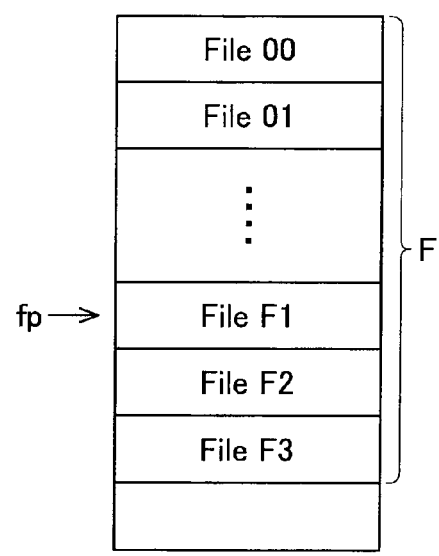
FIG. 2 shows one example of data file list.
Figure 3:
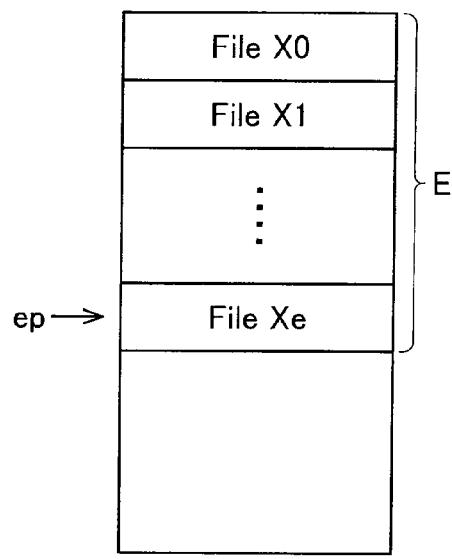
FIG. 3 shows one example of error file list.

The RAM 16 stores data files input in the data file input unit 18. The RAM 16 stores various data generated by the control unit 12 when the control unit 12 performs a process in accordance with the program. The RAM 16 stores a data file list 160 and an error file list 162. As shown in FIG. 2, file names of the data files input in the data file input unit 18 are recorded in the data file list 160. The data file list 160 includes a data file pointer fp that indicates a data file that is to be processed by the control unit 12 in a process as described in detail later. A file number F in the data file list 160 indicates a number of the data files recorded in the data file list 160. As shown in FIG. 3, file names of data files that have caused the memory full error while being processed by the control unit 12 are recorded in the error file list 162. The error file list 162 includes an error file pointer ep that indicates a data file that is to be processed by the control unit 12 in processing as described in detail later. A file number E in the error file list 162 indicates a number of data files recorded in the error file list 162.

The display unit 22 displays a variety of information. The operation unit 24 has a plurality of keys including ten-keys, a start-key and a cancel-key. A user may input instructions and information to the printing device 10 by using the keys in the operation unit 24. The print performing unit 20 may print an image on a print medium in accordance with printing data generated by the control unit 12.

(Process Performed by the Control Unit)

Figure 4:
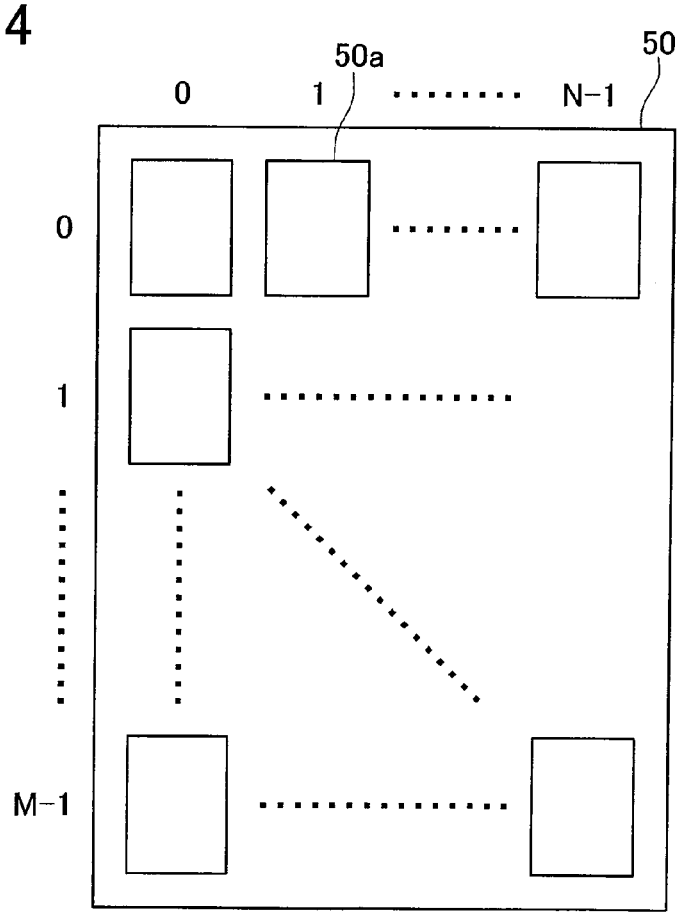
FIG. 4 shows one example of a result of index printing.

The control unit 12 generates index printing data from the data files input in the data file input unit 18. As shown in FIG. 4, a plurality of images 50a is printed on a sheet 50 after an index printing operation is completed in accordance with the index printing data. The plurality of images 50a (in FIG. 4, reference numeral 50a is given to only one image) is distributed on the sheet 50 in accordance with N (columns)×M (rows) matrix layout. The numbers indicated at the top side of the sheet 50 indicate column numbers of each image (printing data), and the numbers indicated at the left side of the sheet 50 indicate row numbers of each image. For instance, the image indicated with the reference numeral 50a has the column number of 1 and the row number of 0. In the followings, the position of the image within the matrix layout will be defined by (column number, row number) in accordance with a coordinate format. That is, the position of the image indicated with the reference numeral 50a is (1, 0).

Figure 5:
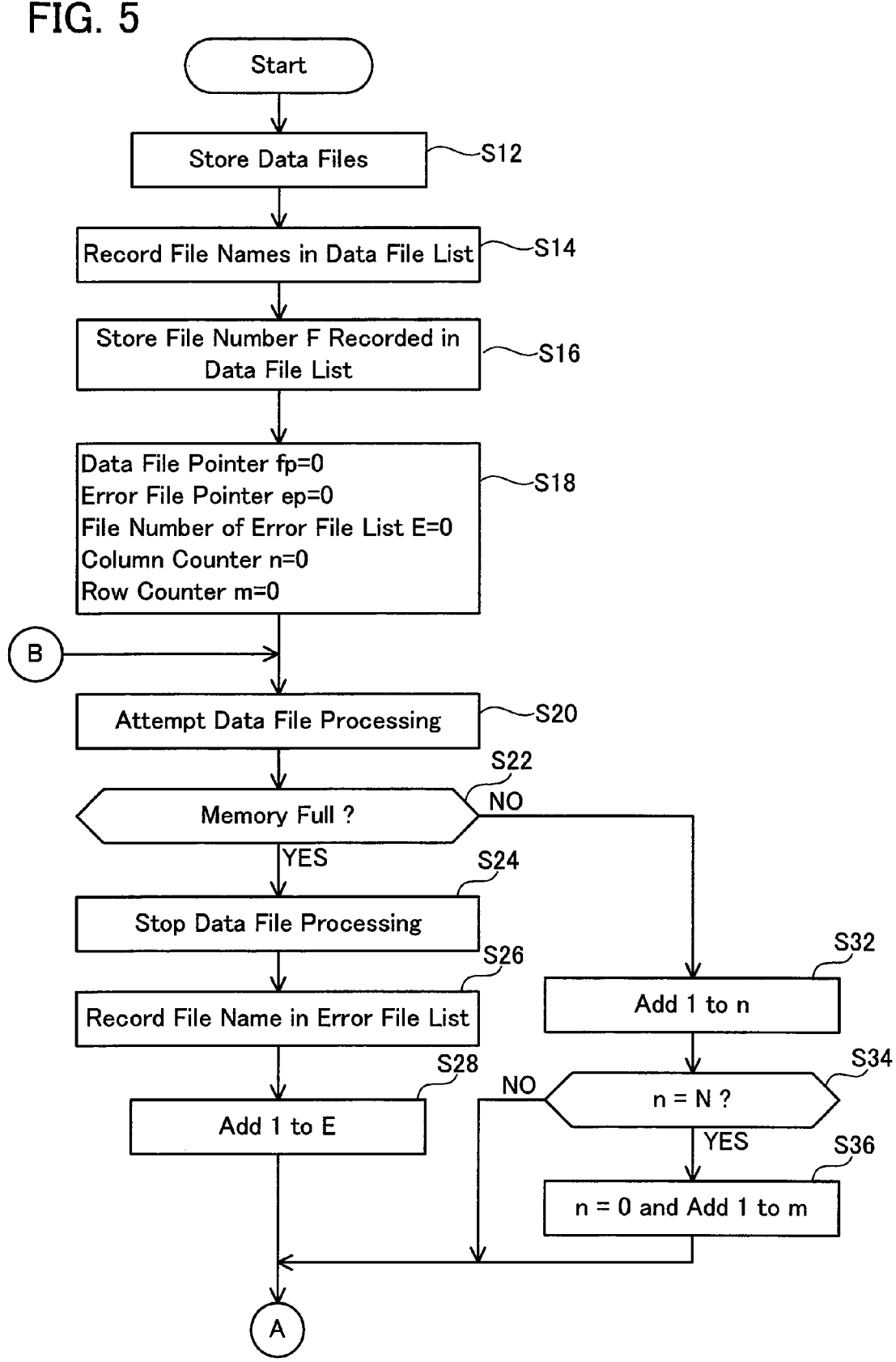
FIG. 5 shows a flow chart of a process performed by a control unit of a first embodiment for generating index printing data.
Figure 6:
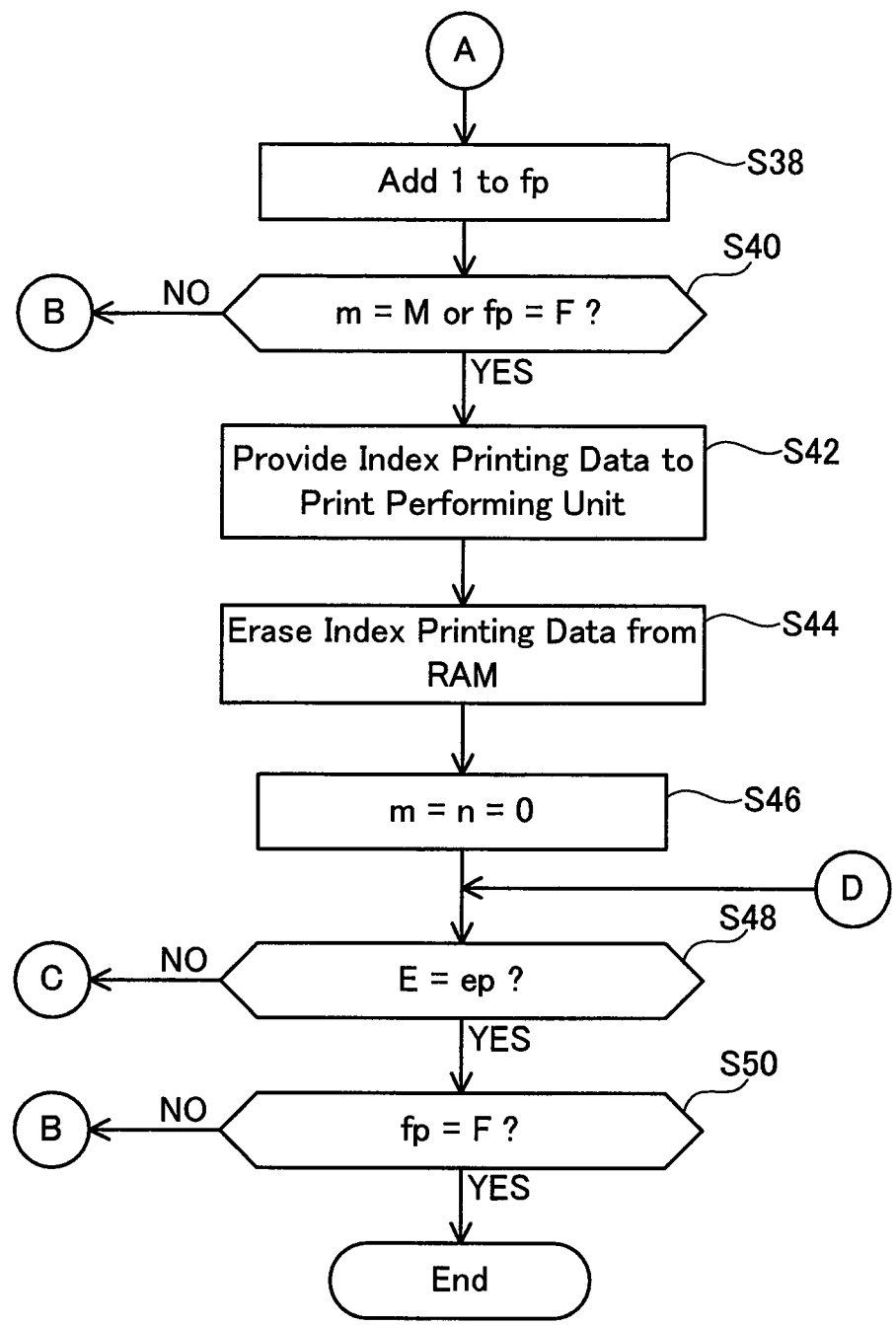
FIG. 6 shows a flow chart that is a continuation of the flow chart of FIG. 5.
Figure 7:
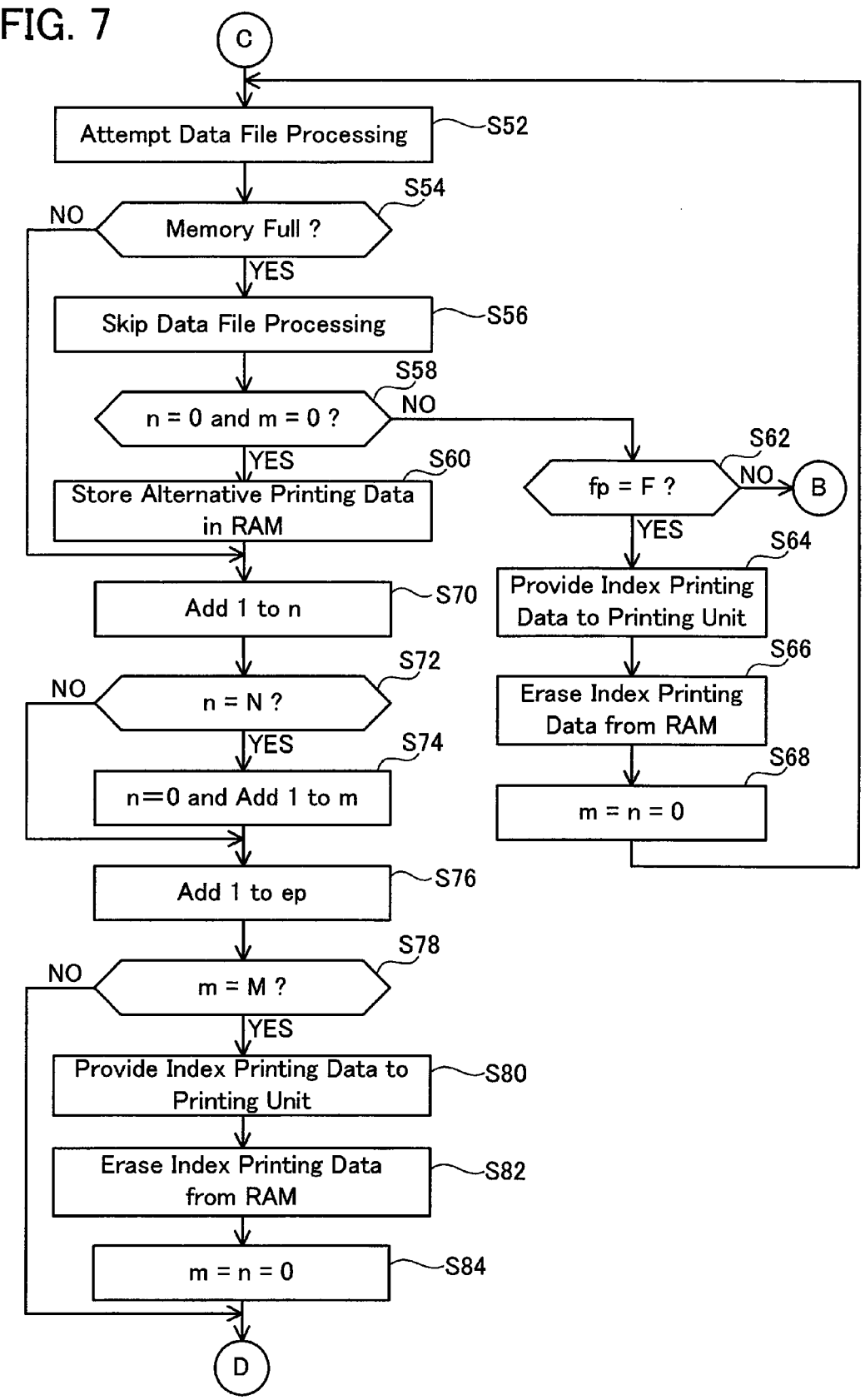
FIG. 7 shows a flow chart that is a continuation of the flow chart of FIG. 6.

The control unit 12 executes the procedures as shown in FIGS. 5 to 7, when a plurality of data files is input to the printing device 10 via the data file input unit 18. The control unit 12 stores each data file included in the input data files in the RAM 16 (S12). The control unit 12 records file names of the input data files in the data file list 160 (S14). The file names are recorded in the data file list 160 in an order that the data files were input in the data file input unit 18. Alternatively, the control unit 12 may record the file names in an alphabetic order thereof in the data file list 160. The file name here refers to a portion of the data file name (e.g., a letter string) in front of an extension indicating the kind of the data file in a case where the extension is included within the file name. As another alternative, the control unit 12 may record the file names in an order of time (last update time) at which each data file had been generated. The control unit 12 stores the file number F in the RAM 16 (S16). The file number F is equal to the number of data files that had been recorded in the data file list 160. The file number F set in this step is an integer equal to or larger than 1. The control unit 12 resets the data file pointer fp of the data file list 160 to 0, the error file pointer ep of the error file list 162 to 0, the file number E to 0, the column counter n to 0, and the row counter m to 0 (S18). The data file pointer fp indicates an order number of a data file to be processed among the plural file names in the data file list 160. The error file pointer ep indicates an order number of a data file among to be processed among one or more file names in the error file list 162. The column counter n and row counter m indicate a location within the matrix layout where an image described by a data file being processed by the control unit 12 is arranged. The numbers fp, ep, E, n and m are integers equal to or greater than 0.

In step S20, the control unit 12 selects one data file in accordance with the data file pointer fp. Specifically, the control unit 12 selects one data file whose name is stored in the data file list 160 in the fp-th order. Then the control unit 12 attempts to generate a set of printing data by processing the selected data file of the fp-th order, and dispose the set of printing data at a position of (n, m) in the index printing data. In this embodiment, a data file type to be processed by the control unit 12 is predetermined. The data file type to be processed may be a file having predetermined extension of one of jpg, txt and ps. When a data file that does not have the predetermined extension is include in the data files, the control unit 12 does not process the data file. In this case, the control unit 12 erases the file name of the data file from the data file list 160, and 1 is subtracted from the file number F. Alternatively, the control unit 12 may skip storing the file name of the data file that does not have the predetermined extension in the data file list 160. The index printing data generating process may include a process of reading out data included in the data file, a process of converting the data into page description language (PDL data), a process of rasterizing the PDL data, etc. Alternatively, the index printing data generating process may include a process of converting the data of the data file (or PDL data) into intermediate language (intermediate language data), a process of rasterizing the intermediate language data, etc. The control unit 12 monitors whether a shortage of the remaining capacity of the RAM 16 (memory full error) occurs during processing of the data file of fp-th (S22). The control unit 12 generates a set of printing data from the data file using the RAM 16. The control unit 12 stores the set of printing data in the RAM 16. Accordingly, the capacity of the RAM 16 that the control unit 12 is capable of utilizing for generating the printing data is reduced. Often, the capacity of the RAM 16 that the control unit 12 utilizes during generating the printing data is greater than the capacity of the RAM 16 for storing the generated printing data. The control unit 12 monitors that the memory full error occurs during generating the printing data. The control unit 12 further monitors that the memory full error occurs when storing the generated printing data. When the memory full error occurs (YES in S22), the control unit 12 then stops the process of the data file (S24). Then, the control unit 12 records the file name of the data file of fp-th order in the data file list 160 into the error file list 162 (S26). In this step, the file name of the data file of fp-th is recorded at the E-th order in the error file list 162. Then the control unit 12 adds 1 to E (S28) and proceeds to step S38 shown in FIG. 6. As a result of the above processes, a process of a particular data file is postponed, the particular data file being a data file that the control unit 12 was not capable of processing due to the shortage of the remaining memory capacity of the RAM 16. Among the various data types to be processed by the control unit 12, a data file having extension of ps tends to cause the memory full error.

In a case where the memory full error does not occur when generating the printing data from the data file of fp-th, and the memory full error does not occur when storing the generated printing data in the RAM 16 (NO in S22), the control unit 12 adds 1 to the column counter n (S32). Then, the control unit 12 determines whether the column counter n reaches N (S34). The condition of n=N may be referred to as a condition in which the n sets of printing data to be arranged in the m-th row have all been prepared. In this case (YES in S34), the control unit 12 resets the column counter n to 0, adds 1 to the row counter m (S36), and then proceeds to S38. In a case where the column counter n does not reach N (NO in S34), step S36 is skipped to proceed to step S38 shown in FIG. 6.

In step S38, the control unit 12 adds 1 to the data file pointer fp. As a result, a subsequent data file having the next order in the data file list 160 is processed by the control unit 12. Then, the control unit 12 determines whether the row counter m reaches M or the data file pointer fp reaches F (S40). When the index printing data describing images of (n×m) sets is completed, the row counter m reaches M. When the processes for all data files corresponding to all file names recorded in the data file list 160 have been attempted, the data file pointer fp reaches F. When the row counter m is not equal to M and the data file pointer fp is not equal to F (NO in S40), the process proceeds to S20 shown in FIG. 5.

When the row counter m is equal to M or the data file pointer fp is equal to F (YES in S40), the control unit 12 provides the generated index printing data to the print performing unit 20. When the print performing unit 20 receives the index printing data, the print performing unit 20 prints the images included in the index printing data on the sheet. The control unit 12 thus erases the previously generated index printing data from the RAM 16 (S44). That is, the area storing the previously generated index printing data is released to be available for use as a work area. Then, the control unit 12 resets the column counter n and row counter m to 0 (S46). The control unit 12 generates new index printing data which is subsequent to the previously generated index printing data. In step S48, the control unit 12 determines whether the error file pointer ep reaches E. When the processes for all the data files recorded in the error file list 162 have been attempted, the error file pointer ep reaches E. When no data files are recorded in the error file list 162, the error file pointer ep also reaches E. When the error file pointer ep is equal to E, then the control unit 12 determines whether the data file pointer fp reaches F (S50). When the data file pointer fp reaches F (YES in 50), the control unit 12 ends the process. In a case where the file pointer fp does not reach F (NO in S50), the process proceeds to S20 shown in FIG. 5.

In a case where the error file pointer ep is not equal to E (NO in S48), the process proceeds to step S52 shown in FIG. 7. In step S52, the control unit 12 processes a data file corresponding to a file name that is recorded at the ep-th order in the error file list 162. The control unit 12 attempts to dispose the printing data defining an image described by the data file of ep-th at the position of (n, m) in the matrix layout of the index printing data. As a result, the data file that had caused the memory full error is attempted. In step S54, the control unit 12 monitors whether the memory full error occurs during step S52. If the memory full error did not occur when generating the printing data from the data file, and the memory full error did not occur when storing the printing data in the RAM 16 (NO in S54), the process proceeds to S70. If the memory full error occurs (YES in S54), the process proceeds to S56 and the control unit 12 stops the process of the data file.

After S56, the control unit 12 determines whether the column counter n is 0 and the row counter m is 0 (S58). When the column counter n is 0 and the row counter m is 0, index printing data stored in the area is null, and an area of the RAM 16 that the control unit 12 is capable of utilizing when processing the data file has the maximum memory capacity. Therefore, a condition where n is 0, m is 0, and the memory full error occurs means a condition where the control unit 12 can not process the data file although the remaining memory capacity is the maximum. In this case, the control unit 12 can not generate the index printing data including the printing data corresponding to the data file because the control unit 12 can not process the data file. Thus, in this case (YES in S58), the control unit 12 stores an alternative set of printing data in the RAM 16 (S60). The alternative set of printing data may be stored in the ROM 14. In an alternative embodiment, the alternative set of printing data may be prepared from the file name of the data file that the control unit 12 was not able to process.

In a case where the column counter n is not 0 or the row counter m is not 0 (NO in S58), the control unit 12 determines whether the data file pointer fp has reached F (S62). If NO in S62, the process returns to S20 shown in FIG. 5. If the data file pointer fp has reached F (YES in S62), the control unit 12 provides the index printing data that has just been generated to the print performing unit 20 (S64). When the print performing unit 20 receives the index printing data, the print performing unit 20 prints the images included in the index printing data on the sheet. The control unit 12 erases the index printing data from the RAM 16 after the index printing data has been provided to the print performing unit 20 (S66). Then the control unit 12 resets both the column counter n and the row counter m to 0 (S68), and the process returns to S52.

In step S70, the control unit 12 adds 1 to the column counter n. Then the control unit 12 determines whether the column counter n is equal to N (S72). If YES in S72, the control unit 12 resets the column counter n to 0 and adds 1 to the row counter m (S74). If NO in S72, the process proceeds to S76. In S76, the control unit 12 adds 1 to the error file pointer ep (S76). Then, the control unit 12 determines whether the row counter m reaches M (S78). If NO in S78, the process proceeds to S48 shown in FIG. 6. On the other hand, if YES in S78, the control unit 12 provides the index printing data that has just been generated to the print performing unit 20 (S80). When the print performing unit 20 receives the index printing data, the print performing unit 20 prints the images on the sheet. The control unit 12 then erases the index printing data from RAM 16 (S82). The control unit 12 resets both the column counter n and the row counter m to 0 (S84). Then, the process proceeds to S48 shown in FIG. 6.

The processes performed by the printing device 10 in the first embodiment have been explained in depth. In the followings, a working example obtained by the above procedure will be explained. In the following working example, fourteen data files A1 to A14 are stored in the RAM 16, and a predetermined layout of the index printing is 3 (columns)×3 (rows) matrixes. That is, N=3 and M=3. In the data file list 160, the data file names of the data files A1 to A14 are recorded in this order. The control unit 12 selects the data files sequentially. That is, the control unit 12 selects A1, A2, A3 . . . in this order successively. If a memory full error occurs while the data file A5 has been selected and the index printing data is being generated from the data file A5, the control unit 12 records the file name of data file A5 in the error file list 162. The control unit 12 then skips or postpones the index printing data generating process for data file A5. The control unit 12 then starts the process for the data file A6, which is subsequent to the failed data file A5 in the predetermined order. If then, for example another memory full error happens while the data file A8 has been selected and the index printing data is being generated therefrom, the control unit 12 records the file name of data file A8 in the error file list 162 and skips or postpones the index printing data generating process for the data file A8. It may also be said that the file names of data files A5 and A8 are recorded in the error file list 162 in the first and second order respectively. Then, the control unit 12 then starts the process for the data file A9, which is subsequent to the failed data file A8 in the predetermined order. When the control unit 12 generated the printing data from the data file A11, the control unit 12 provides the generated index printing data (hereinafter referred to as first index printing data) to the print performing unit 20.

Figure 8:
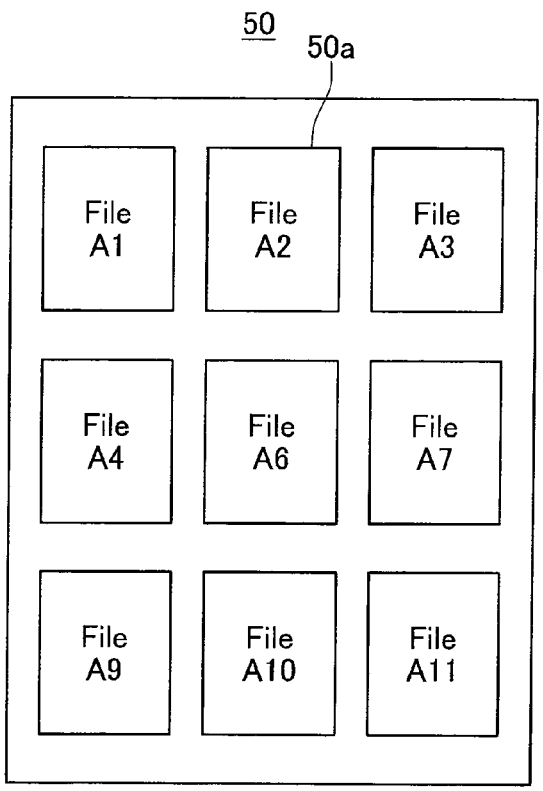
FIG. 8 shows one example of a printing result of index printing data generated by the control unit of the first embodiment.
Figure 9:
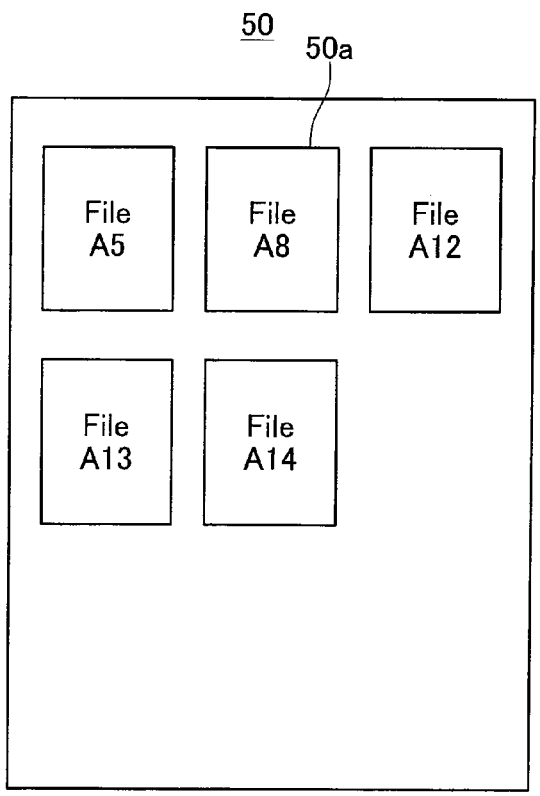
FIG. 9 shows one example of a printing result of index printing data generated by the control unit of the first embodiment.

After the first index printing data was provided, the first index printing data stored in the RAM 16 is erased. Then the control unit 12 starts the second round of the index printing data generating process for the data file A5. Then, the index printing data generating process for data file A8 is again conducted. After the generating for the previously failed data files A5 and A8 is finished, the index printing data generating processes for the data files A12, A13 and A14 are sequentially conducted. When the control unit 12 generated the printing data from the data file A14, the control unit 12 provides the generated index printing data (hereinafter referred to as second index printing data) to the print performing unit 20. FIG. 8 shows an example of a first page obtained by index printing based on the first index printing data, and FIG. 9 shows an example of a second page obtained by index printing based on the second index printing data. In FIGS. 8 and 9, as a plurality of images 50a printed on the sheet 50, each file name corresponding to each image 50a is shown instead of the actual images corresponding to the data files. In actual printing, the corresponding images are printed at the respective locations of within the matrix layout. As shown in FIG. 8, the images described by the data files A5, A8 are not included in the sheet 50 of the first page. As shown in FIG. 9, the image 50a corresponding to the data file A5 is arranged at a position of (0, 0) on the second page, and the image 50a corresponding to the data file A8 is arranged at a position of (1, 0) on the second page.

According to the embodiment, the data files A5, A8 that could not have been processed due to the memory full error are again selected and processed in the process of generating the second index printing data which is generated subsequent to the first index printing data. In the process of generating the second index printing data, the area of the RAM 16 that has been used for generating the first index printing data is available. Therefore, it may be possible that the available memory capacity at a time of processing the data files A5 and A8 for generating the second index printing data becomes larger than the available memory capacity at a time of processing the data files A5 and A8 for generating the first index printing data. In this case, the possibility increases that the control unit 12 succeeds in processing the data files A5, A8 and generating the printing data corresponding to the data files A5, A8. In the above embodiment, the data file A5 is first processed in the generation of the second index printing data. Upon beginning to generate the second index printing data, no index printing data is stored in the RAM 16. That is, the memory capacity of the RAM 16 that the control unit 12 can utilize for processing the data file A5 is the maximum capacity because the data file A5 is processed just after the first index printing data was erased from the RAM 16. The possibility increases that the control unit 12 succeeds in processing the data file A5. Further, the data files A5, A8 are continuously processed. Therefore, the possibility increases that the control unit 12 succeeds in processing the data file A8 and generating the printing data corresponding to the data file A8.

In the first embodiment, when the memory full error occurs, the control unit 12 does not stop and cancel the further process of generating the first index printing data; instead, the control unit 12 continues the process by simply skipping the process for data file A5. In the example of FIG. 8, the data files A6, A7 etc. subsequent to A5 are processed in generating the fist index printing data. Therefore, it is possible to increase the number of images printed based on the first index printing data. As a result, compared with the case of stopping and canceling the further process of generating the first index printing data when the memory full error occurs in the process for data file A5, the number of sheets necessary for index printing is reduced.

Figure 10:
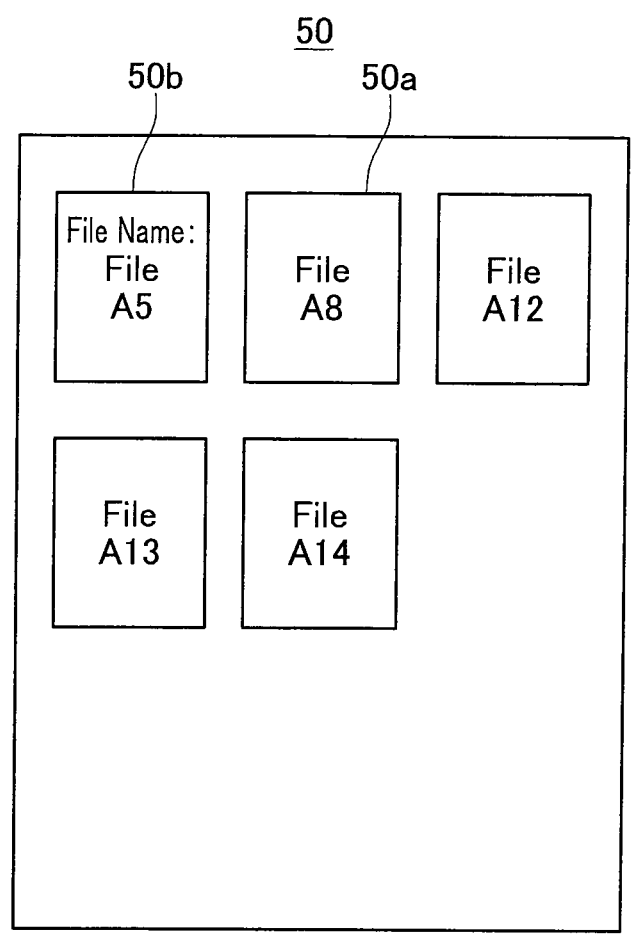
FIG. 10 shows one example of a printing result of index printing data generated by the control unit of the first embodiment.

FIG. 10 shows another example of a sheet printed based on the second index printing data. FIG. 10 corresponds to a case in which the memory full error has occurred again for the data file A5 while the data file A5 is being processed in the second index printing data generating process. The control unit 12 stores an alternate set of printing data in the RAM 16. As shown in FIG. 10, the alternate image 50b corresponding to the alternate set of printing data of the data file A5 is disposed at a position of (0, 0). The alternate image 50b indicates the file name of the data file A5. The alternate image 50b may indicate at least one of a type of the data file A5, time when the data file A5 was generated, etc. The alternate image 50b may be an image corresponding to a default printing data that is stored in the ROM 14. According to this technology, when a data file that cannot be processed even in the case where the remaining memory capacity of the RAM 16 has a larger capacity, it is capable of generating the index printing data including the alternate set of printing data. Further, the user can know that the data file exists which was not processed.

(Second Embodiment)

In the second embodiment, the RAM 16 does not store the error file list 162. The control unit 12 adopts different procedure from the first embodiment in index printing, which is shown in the flow chart shown in FIGS. 11 and 12. The steps having the same step numbers as in FIGS. 5 to 7 are the same steps as those therein, and duplicate explanation thereof will be omitted.

Figure 11:
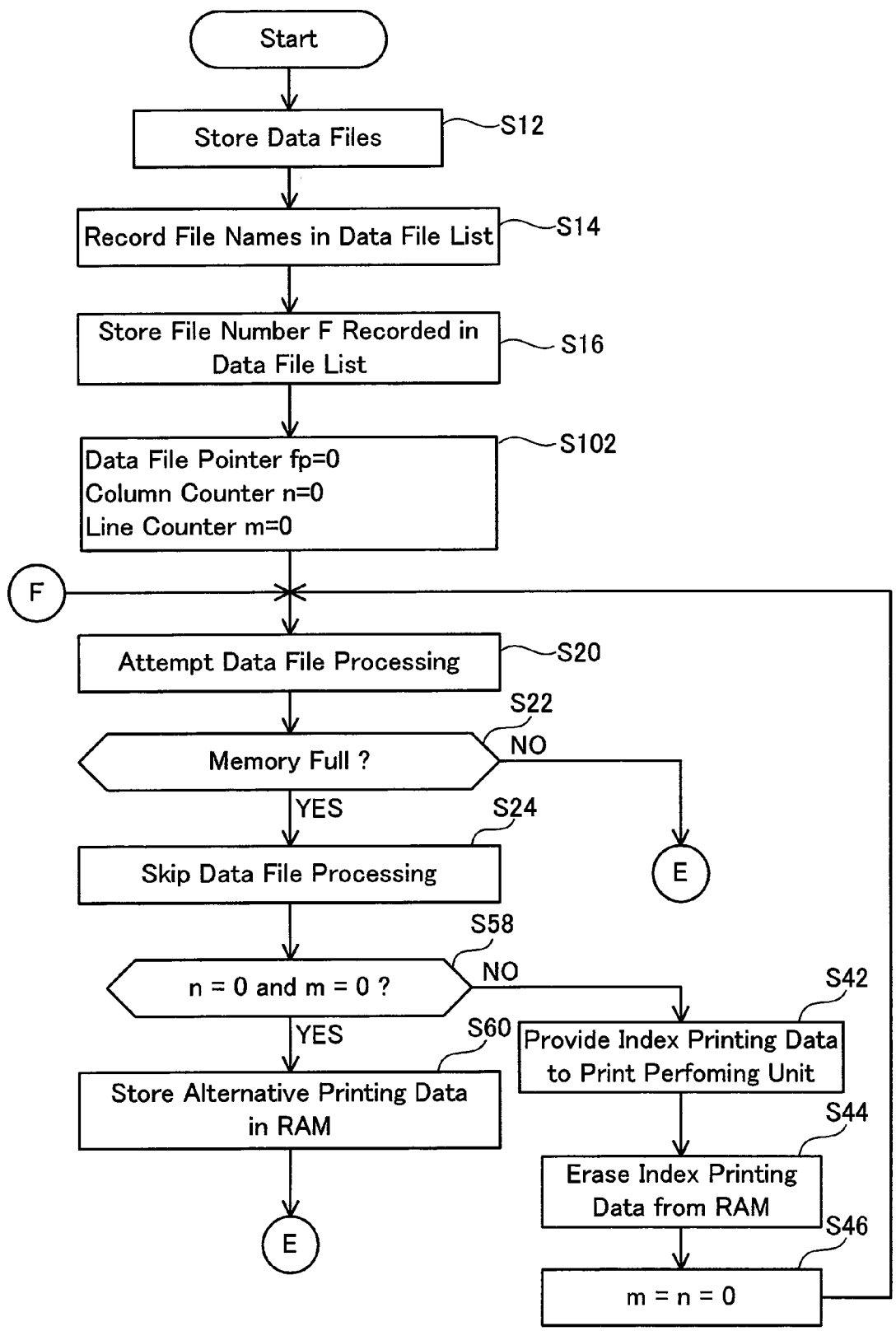
FIG. 11 shows a flow chart of a process performed by a control unit of a second embodiment for generating index printing data.
Figure 12:
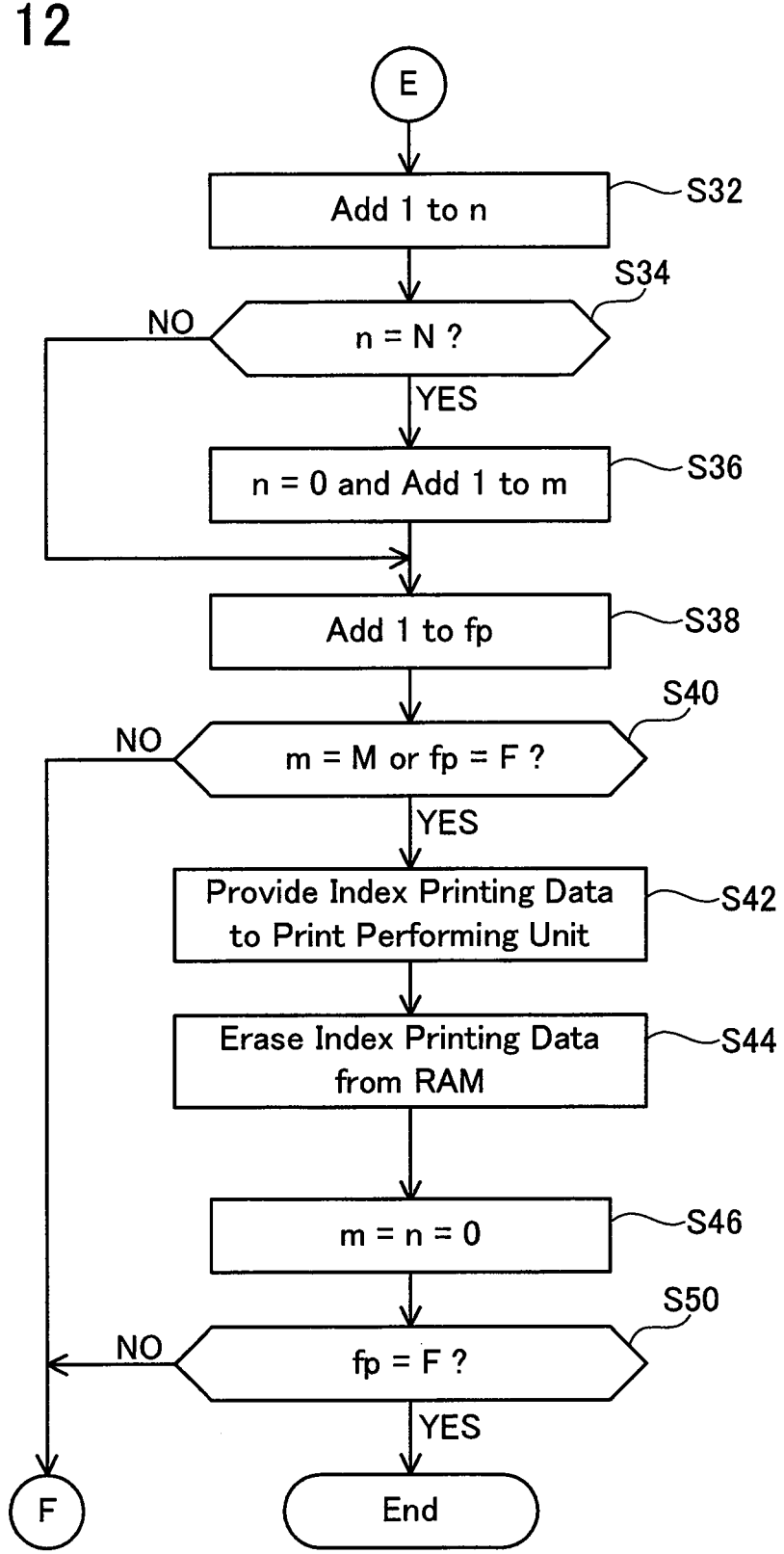
FIG. 12 shows a flow chart that is a continuation of the flow chart of FIG. 11.

When the plural data files are input in the data file input unit 18, the control unit 12 starts the process of FIGS. 11 and 12. The control unit 12 performs the steps S12 to S16. Then in step S102, the control unit 12 resets the data file pointer fp, column counter n and row counter m to 0.

The control unit 12 then performs steps S20 and S22. When the memory full error does not occur (NO in S22), the process proceeds to S32. When the memory full error occurs (YES in S 22), the control unit 12 stops the process for the data file (S24). In step S58, the control unit 12 determines whether n is equal to 0 and m is equal to 0. If n is not equal to 0 or m is not equal to 0 (NO in S58), the control unit 12 performs steps S42 to S46, then returns to S20. If n is equal to 0 and m is equal to 0 (YES in S58), the control unit 12 stores an alternate set of printing data in the RAM 16 (S60), and proceeds to S32 shown in FIG. 12. Then the control unit 12 performs steps S32 to S40. If NO in S40, the process returns to S20. If YES in S40, the control unit 12 executes steps S42 to S46 and S50. If YES in S50, then the process ends. If NO in S50, then the process returns to S20.

A working example of the second embodiment will be described below. In this working example, fourteen data files A1 to A14 are stored in the storing area in the RAM 16, and a predetermined layout of the index printing is 3 (columns)×3 (rows) matrixes. That is, N=3 and M=3. In the data file list 160, the data file names of the data files A1 to A14 are recorded in this order. The control unit 12 sequentially selects and processes the data files. If a memory full error occurs while the data file A5 has been selected and the index printing data is being generated from the data file A5, the control unit 12 generates first index printing data including the printing data corresponding to the data files A1 to A4 which have been processed prior to the data file A5. After the control unit 12 provides the first index printing data to the print performing unit 20, the control unit 12 erases the first index printing data from the RAM 16, and then starts to process the data file A5. Further, if the memory full error occurs while the data file A8 has been selected and the index printing data is being generated from the data file A8, the control unit 12 generates second index printing data including the printing data corresponding to the data files A5 to A7 which have been processed prior to the data file A8. After that, the control unit 12 generates third index printing data including the printing data corresponding to the data files A8 to A14.

Figure 13:
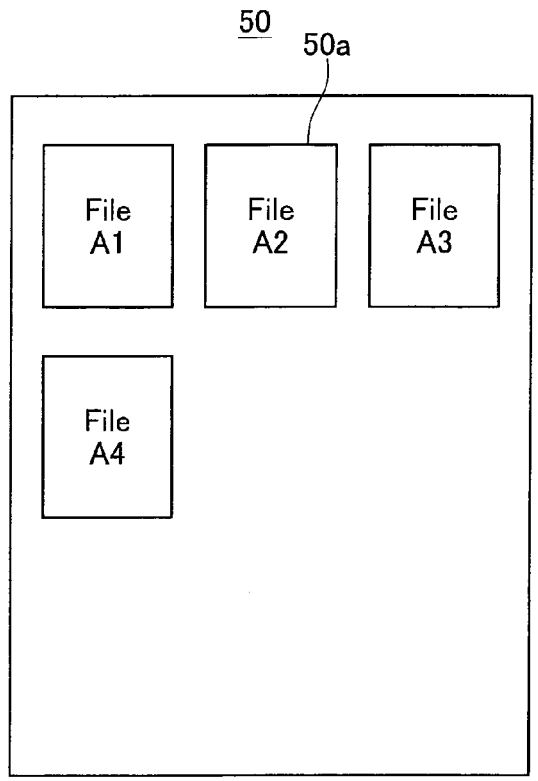
FIG. 13 shows one example of a printing result of index printing data generated by the control unit of the second embodiment.
Figure 14:
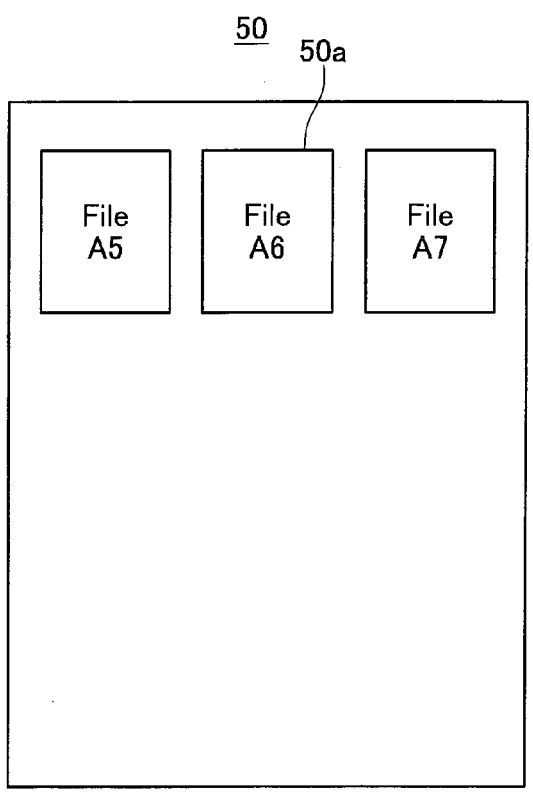
FIG. 14 shows one example of a printing result of index printing data generated by the control unit of the second embodiment.
Figure 15:
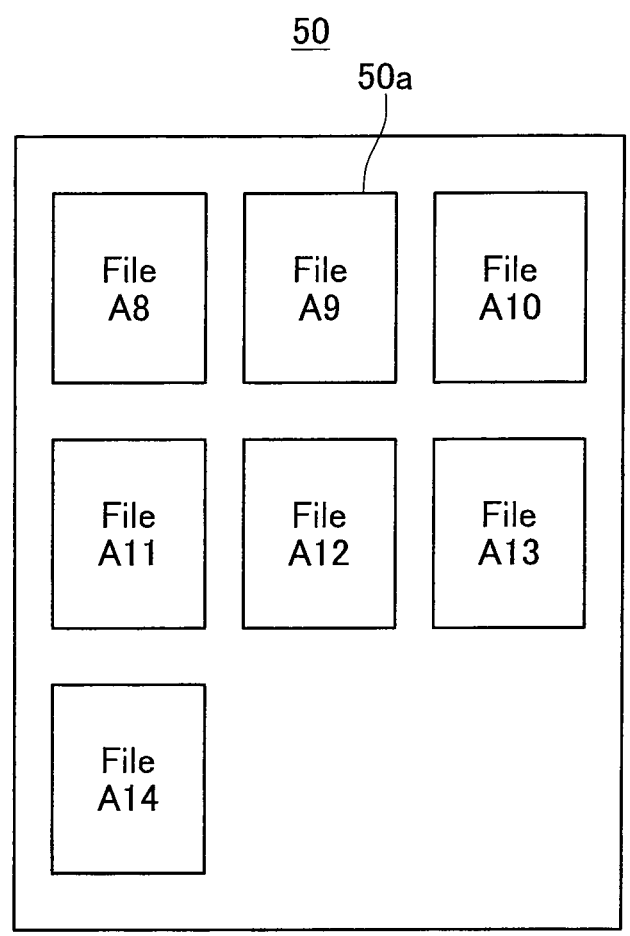
FIG. 15 shows one example of a printing result of index printing data generated by the control unit of the second embodiment.

FIG. 13 shows an example of a first page obtained by index printing based on the first index printing data, FIG. 14 shows an example of a second page obtained by index printing based on the second index printing data, and FIG. 15 shows an example of a third page obtained by index printing based on the third index printing data. In FIGS. 13 to 15, as a plurality of images 50a printed on the sheet 50, each file name corresponding to each image 50a is shown instead of the actual images corresponding to the data files. As shown in FIG. 13, the images corresponding to the data file A5 (the process for the data file A5 was postponed), A6, A7 . . . are not included in the first page of the sheet 50. As shown in FIG. 14, the image 50a corresponding to the data file A5 is disposed at a position of (0, 0) of the second page. The images corresponding to the data file A8 (the process for the data file A8 was postponed), A9 A10 . . . are not included in the second page of the sheet 50. As shown in FIG. 15, the image 50a corresponding to the data file A8 is disposed at a position of (0, 0) of the third page.

In the second embodiment, the data file A5 that could not have been processed due to the memory full error in generating the first index printing data is again processed as the data file that is processed at first (the first-to-be-processed data file) in generating the second index printing data. This procedure reduces the possibility that the memory full error occurs in generating the second index printing data from the data file A5, because the memory capacity available to generate the second index printing data is maximized or is at the least increased. In the same manner, the data file A8 that could not have been processed due to the memory full error in generating the second index printing data is again processed as the first-to-be-processed data file in generating the third index printing data. This procedure reduces the possibility that the memory full error happens in generating the third index printing data from the data file A8, because the memory capacity available to generate the third index printing data is maximized or is at the least increased.

In the second embodiment, once the control unit 12 fails to generate the first index printing data from the data file A5, then the first index printing data is completed without waiting for the process for the subsequent data file A6. By doing so, it may be possible to quickly complete the first index printing data. The second embodiment is effective in shortening a time period which is necessary for performing index printing based on the first index printing data.

According to the first and second embodiments, when index printing data for one page (sheet) is completed, the index printing data for the page is provided to the print performing unit 20 (e.g., S42 in FIG. 6). That is, the control unit 12 generates the index printing data in unit of page (utilizing a page memory). However, the control unit 12 may generate the index printing data in unit of band. That is, when index printing data for one band is completed, the index printing data for the band may be provided to the print performing unit 20.

According to the first and second embodiments, after the control unit 12 provides the index printing data to the print performing unit 20, and erases the index printing data from the RAM 16, the control unit 12 starts to generates the subsequent, new index printing data. However, it is possible that providing the previous (e.g., first) index printing data to the print performing unit 20 and generating the subsequent (e.g., second) index printing data are performed at least in part simultaneously.

The control unit 12 may be set such that after the previous index printing data was provided to the print performing unit 20, the control unit 12 is capable of over-writing on an area of the RAM 16 in which the previous index printing data has been stored. Writing new data over old data is a combination of erasing the old data and storing the new data. Generally speaking, after the previous index printing data was provided to the print performing unit 20, the RAM 16 returns to a state of timing when the control unit 12 started generating the previous index printing data.

Alternately, in the aforesaid first and second embodiments, the printer 10 comprises a controller (control unit 12) for generating the index printing data, however, an external device such as PDA (Personal Digital Assistant) capable of communicating with the printer 10 may be utilized as the controller. This controller may be utilized with the control unit 12 or without the control unit 12.

In the first embodiment, the data files A5 and A8 that had caused memory full error in generating the first index printing data are processed again in generating the second index printing data. However, processing the data file A8 may be postponed until when the third index printing data is generated. In this case, the data file A5 is processed in generating the second index printing data, and the data file of A8 is processed in generating the third index printing data.

The printer 10 may be a multi-function device for performing a printing function and another function such as fax function, scan function, etc.

In the first and second embodiments, the control unit 12 and the ROM 14 are one example of a controller. The control unit 12 performs various processing in accordance with the programs stored in the ROM 14. The control unit 12 sequentially selects a data file from a plurality of data files in accordance with a predetermined order; and as such, the control unit 12 is an example of a data file selecting unit. The control unit 12 sequentially processes the sequentially selected data file in order to generate the index printing data, and as such, the control unit 12 is also an example of an index printing data generating unit. The control unit 12 provides the index printing data to the print performing device 20, and as such, the control unit 12 is also an example of a providing unit.

What is claimed is:

1. A controller for a printing device including a print performing unit, the controller comprising:
a processor configured to operate as:
a data file selecting unit configured to sequentially select a data file from a plurality of data files in accordance with a predetermined order;
an index printing data generating unit configured to generate index printing data, including plural sets of printing data corresponding to plural data files, by sequentially processing the sequentially selected data file using a memory, and by sequentially storing a set of printing data in the memory, wherein the set of printing data defines an image described by the sequentially selected data file; and
a providing unit configured to provide the index printing data to the print performing unit each time when the index printing data is generated,
wherein, after the providing unit provides the index printing data to the print performing unit, the index printing data generating unit becomes capable of generating subsequent index printing data using an area in the memory which has been used for generating the index printing data,
wherein in a case where the index printing data generating unit cannot process a particular data file due to a shortage of remaining capacity in the memory when first index printing data is generated, the index printing data generating unit is configured to postpone processing of the particular data file,
wherein the data file selecting unit is configured to select the particular data file when second index printing data is generated, wherein the second index printing data is generated after the first index printing data has been generated,
wherein the data file selecting unit is configured to sequentially select one or more data files which are to be selected subsequent to the particular data file when the index printing data generating unit generates the first index printing data, and
wherein the index printing data generating unit is configured to generate the first index printing data including one or more sets of printing data corresponding to the one or more data files.

2. The controller as in claim 1, wherein
the data file selecting unit is configured to select the particular data file first when the index printing data generating unit generates the second index printing data.

3. The controller as in claim 2, wherein
in a case where the index printing data generating unit cannot further process the particular data file due to the shortage of remaining capacity in the memory when the second index printing data is generated, the index printing data generating unit is configured to store an alternative set of printing data instead of a set of printing data corresponding to the particular data file.

4. The controller as in claim 1, wherein
in a case where the index printing data generating unit cannot process two or more particular data files due to the shortage of remaining capacity in the memory when the first index printing data is generated, the index printing data generating unit is configured to postpone processing of the two or more particular data files, and
the data file selecting unit is configured to select the two or more particular data files continuously when the index printing data generating unit generates the second index printing data.

5. A printing device comprising:
the controller as in claim 1; and
the print performing unit configured to perform printing in accordance with the index printing data provided from the controller.

6. A method for controlling a printing device including a print performing unit, the method comprising:
selecting a data file sequentially from a plurality of data files in accordance with a predetermined order;
generating index printing data, including plural sets of printing data corresponding to plural data files, by sequentially processing the sequentially selected data file using a memory, and by sequentially storing a set of printing data in the memory, wherein the set of printing data defines an image described by the sequentially selected data file; and
providing the index printing data to the print performing unit each time when the index printing data is generated,
wherein, after providing the index printing data to the print performing unit, subsequent index printing data is generated using an area in the memory which has been used for generating the index printing data,
wherein, in the generating, in a case where a particular data file cannot be processed due to a shortage of remaining capacity in the memory when first index printing data is generated, processing of the particular data file is postponed,
wherein the selecting includes selecting the particular data file when second index printing data is generated, wherein the second index printing data is generated after the first index printing data has been generated,
wherein the selecting includes sequentially selecting one or more data files which are to be selected subsequent to the particular data file when the first index printing data is generated, and
wherein the generating includes generating the first index printing data including one or more sets of printing data corresponding to the one or more data files.

7. A non-transitory computer readable medium storing computer-executable instructions that, when executed by at least one processor, cause a computer, which is mounted on a printing device including a print performing unit, to perform:
selecting a data file sequentially from a plurality of data files in accordance with a predetermined order;
generating index printing data, including plural sets of printing data corresponding to plural data files, by sequentially processing the sequentially selected data file using a memory, and by sequentially storing a set of printing data in the memory, wherein the set of printing data defines an image described by the sequentially selected data file; and
providing the index printing data to the print performing unit each time when the index printing data is generated,
wherein, after providing the index printing data to the print performing unit, subsequent index printing data is generated using an area in the memory which has been used for generating the index printing data,
wherein, in the generating, in a case where a particular data file cannot be processed due to a shortage of remaining capacity in the memory when first index printing data is generated, processing of the particular data file is postponed, and
wherein the selecting includes selecting the particular data file when second index printing data is generated, wherein the second index printing data is generated after the first index printing data has been generated, wherein the selecting includes sequentially selecting one or more data files which are to be selected subsequent to the particular data file when the first index printing data is generated, and wherein the generating includes generating the first index printing data including one or more sets of printing data corresponding to the one or more data files.

8. The non-transitory computer readable medium as in claim 7, wherein the particular data file is selected first when the second index printing data is generated.

9. The non-transitory computer readable medium as in claim 7, wherein, in a case where the particular data file cannot be processed due to a shortage of remaining capacity in the memory when the second index printing data is generated, storing an alternative set of printing data instead of a set of printing data corresponding to the particular data file.

10. The non-transitory computer readable medium as in claim 7, wherein in a case where two or more particular data files cannot be processed due to the shortage of remaining capacity in the memory when the first index printing data is generated, processing of the two or more particular data files is postponed, and the two or more particular data files are selected continuously when the second index printing data is generated.

* * * * *